United States Patent [19]

De Rooij et al.

[11] Patent Number: 4,873,108

[45] Date of Patent: Oct. 10, 1989

[54] PROCESS FOR PREPARING HYDROGEN CHLORIDE HYDROLYZED PROTEIN

[75] Inventors: Johannes F. M. De Rooij, Sellindge, Great Britain; Stephen E. Meakins, Canterbury, United Kingdom

[73] Assignee: Unilever Patent Holdings B.V., Rotterdam, Netherlands

[21] Appl. No.: 858,751

[22] Filed: May 2, 1986

[30] Foreign Application Priority Data

May 6, 1985 [EP] European Pat. Off. ............ 85200704

[51] Int. Cl.$^4$ .............................................. A23L 1/228
[52] U.S. Cl. .................................... 426/533; 426/422; 426/649; 426/650; 426/656; 426/806
[58] Field of Search ............... 426/533, 649, 650, 656, 426/422, 806; 530/343, 407, 417

[56] References Cited

U.S. PATENT DOCUMENTS 3,519,437 7/1970 Giacino ................................ 426/533
3,952,109 4/1976 Rao et al. ............................. 426/48

OTHER PUBLICATIONS

G. Lalasidis et al., J. Agric. Food Chem., vol. 26, No. 3 1978, pp. 742–749.
G. Lalasidis et al., J. Agric. Food Chem., vol. 26, No. 3 1978 pp. 751–756.

*Primary Examiner*—Donald E. Czaja
*Assistant Examiner*—Celine T. Callahan
*Attorney, Agent, or Firm*—Cushman, Darby & Cushman

[57] ABSTRACT

The invention provides a protein hydrolysate with
(a) a content of NaCl between 0 and 35% w/w;
(b) a content of free amino acids between 25 and 100% w/w; and
(c) a content of glutamic acid between 8 and 60% (w/w calculated as dry matter)

and optionally from 0–75% by weight of the hydrolysate of a saccharide carrier. Such a hydrolysate is obtainable by gel filtration over a porous material having an average pore diameter between 0.5 and 2.5 nanometers and eluting the desired fraction.

3 Claims, No Drawings

PROCESS FOR PREPARING HYDROGEN CHLORIDE HYDROLYZED PROTEIN

The invention relates to an improved protein hydrolysate, more in particular to a protein hydrolysate of which the organoleptic properties have been improved by a reduction of the contents of sodium chloride and so-called apolar amino acids such as leucine, isoleucine, valine, phenylalanine etc.

Hydrolysed proteins are well known and are mainly used as savoury flavours. As a rule they are prepared by hydrolysing a protein material, e.g. casein, gluten and soya protein, by boiling with circa 6N hydrochloric acid followed by neutralisation with sodium hydroxide. As a result, in the liquid hydrolysate some 50% of the dry matter content is sodium chloride. The taste is therefore salty and it is bitter because of the presence of apolar amino acids like leucine, isoleucine, valine and phenylalanine.

Other routes to hydrolyse proteins have also been explored to alleviate the disadvantage of a high salt level, e.g. enzymatic hydrolysis and hydrolysis with sulphuric acid, and subsequent removal of the sulphate ions by precipitation. Enzymatic hydrolysis, even when combining endo- and exo-enzymes, results in a hydrolysate with a high peptide content and poor flavouring properties, whereas sulphuric acid hydrolysis gives rise to highly undesirable off-flavours in the hydrolysate.

Therefore, attempts have been made to improve protein hydrolysates. Thus, DD-A-157 258 (Dr-Ing. L. Baerbel, Dr-Ing. K. Gerd, Minist. F. Land-Forst Nahrungwirtsch. Inst. Milchwirtsch., Oranienburg, GDR) describes a process for improving protein hydrolysate by removing salt and phenylalanine from an aqueous solution with a pH from 2.5-6.0 of the hydrolysate by means of gel filtration over a molecular sieve material with an average pore size below 120/μm and subsequent concentration. It has been established by duplicating this process with a molecular sieve material with an average pore size below 120 micrometer ($=12.10^{-5}$m), namely with a pore size of $1.10^{-8}$m, that only a minor improvement, if any at all, was obtained.

Also, it is known from GB-A-2 066 265 (Chinoin) to reduce the phenylalanine content of protein hydrolysates by subjecting the hydrolysate to chromatography on a column filled with beta-cyclo dextrin polymer.

Finally, US-A-4 243 369 (Mohlenkamp) discloses a sodium-free salt substitute mixture containing an acid hydrolysed protein neutralised with potassium chloride, nucleotides, potassium phosphate, sugar and potassium chloride.

It has now been found that, by using molecular sieves having an average poor size between 0.5 and 2.5 nanometer ($10^{-9}$m), gel filtration of a protein hydrolysate solution in an aqueous medium usually results in a substantial removal of sodium chloride and apolar amino acids.

The present invention therefore provides a protein hydrolysate showing the following features: a content of NaCl between 0 and 35% w/w, an amount of free amino acids between 25 and 100% w/w and a content of glutamic acid between 8 and 60% w/w (all percentages calculated as dry matter) and optionally a carrier material. By judicious elution, fractions can even be obtained containing virtually no sodium chloride. By increasing the fraction size, products with NaCl contents below 20 or below 35% (w/w calculated on dry hydrolysate matter) are obtainable. Dependent on the degree of hydrolysis of the starting material, an improved protein hydrolysate containing up to 100% w/w of free amino acid can be obtained, e.g. when using a hydrolysate from wheat gluten with 6N HCl with a prolonged time of hydrolysis. Usually the products contain at least 25%, rather at least 40% w/w of free amino acids and, of course, optionally carrier material. Suitable carrier materials are, for example, saccharides like gum arabic, maltodextrin, starch (optionally modified), cellulose, dextran.

As a result of the gel filtration technique, also the amounts of non-salt, non-amino acid compounds (such as carbohydrate derivatives, e.g. humins) are also reduced to a level below 20% w/w, preferably below 10% (all calculated on the protein hydrolysate, thus excluding any carrier material present).

Finally, also the percentage of apolar amino acids as defined above, which tend to impart a bitter taste, has been reduced by 20%, preferably at least 50%, more preferably by at least 70% when compared with the content of the starting material. The carrier material discussed above may be present in amounts of 0-75%, preferably 5-50%, the remainder being the improved hydrolysate according to this invention.

The invention therefore also provides a protein hydrolysate composition including a saccharide carrier material, characterised in that 0-75%, preferably 5-50% of the weight of the total composition is a saccharide carrier material and the remainder an improved protein hydrolysate which is characterised by the following features:

(a) a content of NaCl between 0 and 35% w/w;
(b) a content of free amino acids between 25 and 100% w/w and
(c) a content of glutamic acid between 8 and 60% (w/w calculated as dry matter).

As set out above, the improved protein hydrolysate according to the present invention can be prepared by subjecting an aqueous solution of an acid hydrolysed protein with a pH between 2.0 and 8.0 and a dry matter content up to 45% over a molecular sieve with an average pore diameter between 0.5 and 2.5, preferably between 0.5 and 1.5 nanometers, and eluting a suitable fraction which is then normally concentrated to dryness. Very suitable molecular sieves are cross-linked dextrans like Sephadex 10 and 15 (trade name of Pharmacia AB, Uppsala, Sweden). However, Sephadex 25 and 100 proved ineffective.

The protein hydrolysate according to the present invention can be used with advantage as a savoury flavour, in foodstuffs, such as soups, beefburgers, sausages, sauces, goulash etc. Also it can advantageously be used in NaCl-replacers together with conventional ingredients.

More in particular, the improved protein hydrolysate can be advantageously combined with known NaCl-replacers such as potassium chloride, ammonium chloride, potassium adipate and the like, yielding excellent and tasty products.

The improved hydrolysate according to the present invention is also an excellent starting material for the preparation of reaction flavours in which they are reacted with mono- and di-saccharides, cysteine/cystine, thiamine etc, in which reaction flavour a major part of the starting amino acids remain unchanged. The invention is illustrated by the following examples:

EXAMPLE 1

A thermostatic gel-permeation column of length 100 cm and internal diameter 50 mm was filled to a height of 87 cm with pre-swollen Sephadex G-10 resin (a cross-linked dextran ex Pharmacia AB, Uppsala, Sweden) with an average pore size between 0.5 and 1.5 nanometers. The column temperature was raised to 50° C. and the resin was washed with warm (50° C.) de-ionized, de-aerated water at a flow rate of 500 ml/hr for two hours. After this time the flow rate was accurately adjusted to 200 ml/hr. The HCl hydrolysed wheat gluten protein feedstock was prepared by mixing by weight two parts of such a wheat gluten hydrolysate of 41% solids (47% of which is NaCl and 45.9% amino acid) with one part of de-ionised, de-aerated water. An aliquot of this feedstock (pH 5.8) was then applied to the column for one hour at 200 ml/hr followed by de-ionised, de-aerated water at the same flow rate for 3 hours. After the 3 hours had elapsed, a further aliquot of hydrolysed gluten was applied to the column, followed by de-ionised, de-aerated water, at the same flow rate for 3 hours. After the 3 hours had elapsed, a further aliquot of protein hydrolysate was applied to the column, followed by de-ionised, de-aerated water, at the same flow rate and times as for the first cycle. This cyclic pattern of operation allowed the continuous separation of NaCl and amino acids. During all of these cycles the column temperature was maintained at 50° C.

The eluate from the column was collected in 20 ml fractions which were analysed for NaCl and amino acid content. However, at the start of the experiment no fractions were taken for 3 hours as the eluate did not contain amino acids, NaCl or other gluten hydrolysate components.

Analysis of the fractions collected during one complete 4-hour cycle gave the following results:

The combined fractions 1-14 contained 32.7% of the original dry matter. This dry matter consisted of 98.5% of amino acids (leucine, isoleucine, valine and phenylalanine accounted for 2.5% of the amino acid composition, whereas originally 12.4% was present). The percentage of NaCl was below 0.1%. Combined fractions 1-14 were concentrated to 25% solids, 15% w/w maltodextrin added and spray-dried. Fractions 15-40 contained 67.3% of the original dry matter. This dry matter consisted of 20.4% of amino acids and 69.8 of NaCl.

EXAMPLE 2

The procedure followed is described fully in Example 1; however, de-fatted soyabean hydrolysate (HCl) was used as the feedstock. This soya protein hydrolysate had a solids content of 40.4%, of which 47.1% is NaCl and 31.2% are amino acids.

The combined fractions 1-14 contained 33% of the original dry matter. This dry matter consisted of 68.8% of amino acids, of which 22.3% was glutamic acid. Apolar amino acids accounted for 2.4% of the amino acid composition, whereas originally 11.8% was present. The percentage of NaCl was below 0.1% (determined as chloride ions). Fractions 1-14 were concentrated to 25% solids, 15% w/w starch added and spray-dried. Combined fractions 15-40 contained 67% of the original dry matter. This dry matter consisted of 13% of amino acids and 70% of NaCl (excluding the 37,5% starch carrier).

EXAMPLE 3

The procedure followed is described fully in Example 1; however, maize gluten (corn protein) HCl hydrolysate was used as the feedstock. This hydrolysate had a solids content of 41%, of which 47.7% was NaCl and 45.3% were amino acids.

The combined fractions 1-23 contained 62.1% of the original dry matter. This dry matter consisted of 38.0% of amino acid, of which 11.3% was glutamic acid. The percentage of NaCl was 21.1. Apolar amino acids accounted for 2.7% of the total amino acid composition, whereas originally 8.3% was present.

Fractions 1-23 were concentrated to a past of 60% dry matter.

Combined fractions 24-40 contained 37.9% of the original dry matter. This dry matter consisted of 7.3% of amino acids and 26.6% of NaCl.

EXAMPLE 4

A mixture of taste compounds, used to simulate sodium chloride (NaCl-replacer) consisted of:

90 g of potassium chloride
5 g of monopotassium citrate
5 g of monopotassium glutamate.

This mixture was blended with desalinated wheat gluten hydrolysate of Example 1 in a ratio of 1:2 w/w.

On assessment by an experienced panel at a dosage level of 1% in water, the NaCl-replacer/desalinated wheat gluten hydrolysate blend had a savoury, salty impression (excluding the hydrolysate) which was superior to the NaCl-replacer mixture as such. It was clear that the desalinated protein hydrolysate masked the bitter, "woody", off-taste inherent in potassium salts.

EXAMPLE 5

A reaction flavour was prepared by heating the following mixture for 3 hours at 100° C.

1 g of thiamine hydrochloric acid salt
8 g of glucose
4 g of monosodium glutamate
0.5 g cysteine HCL $H_2O$
0.4 g of lactic acid
10 g of desalinated de-fatted soybean hydrolysate (Example 2)
20 g of water.

A second flavour was prepared in an identical way, except that this time the original hydrolysate was used.

On assessment at a dosage level of 2% liquid flavour material in hot water, the flavour based on the desalinated soya hydrolysate was preferred by an expert panel (n=6) and was described as more meaty, cleaner, less harsh than a similar preparation prepared from the original hydrolysate.

EXAMPLE 6

5 g low NaCl maize gluten hydrolysate (Example 3) were added to 1 litre of water which contained the following soup mix:

10 g of sodium chloride
2 g of monosodium glutamate
5 g of beef fat

| -continued |
| --- |
| 20 g of vermicelli |
| 3 g of dried onions |
| 1 g of dried carrots |
| 0.25 g of herb mix. |

The total composition was boiled for 20 minutes. The reference sample contained the starting maize gluten hydrolysate (including much more NaCl and apolar amino acids).

An expert panel preferred the group with desalinated protein hydrolysate, which was described as more meaty and brothy than the reference.

We claim:

1. A process for preparing hydrogen chloride hydrolysed protein, consisting essentially of dissolving the hydrolysate in water and subjecting this solution to gel filtration over a porous material which is a crosslinked dextran and which has an average pore diameter between 0.5 and 2.5 nanometers, and eluting a fraction characterized by:
(a) a content of NaCl between 0 and 35% w/w;
(b) a content of free amino acids between 25 and 100% w/w; and
(c) a content of glutamic acid between 8 and 60% w/w calculated as dry matter; and
(d) that the amount of apolar amino acids relative to total amino acids is reduced by at least 50% of the original value.

2. A process as claimed in claim 1, wherein the pore diameter is between 0.5 and 1.5 nanometers.

3. A process according to claim 1, wherein the process is carried out over a column filled with porous material, involving alternate elution of aqueous protein hydrolysate and water.

* * * * *